US012600280B2

(12) United States Patent

Hammadi et al.

(10) Patent No.: US 12,600,280 B2

(45) Date of Patent: Apr. 14, 2026

(54) SEAT SUPPORT ELEMENT COMPRISING AN ADJUSTABLE REST ELEMENT

(71) Applicant: Faurecia Sièges d'Automobile, Nanterre (FR)

(72) Inventors: Semir Hammadi, Saulx-les-Chartreux (FR); Jean-Yves Piederriere, Angerville (FR); Ahmed Chouah, Etampes (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 256 days.

(21) Appl. No.: 18/104,009

(22) Filed: Jan. 31, 2023

(65) Prior Publication Data

US 2023/0242023 A1  Aug. 3, 2023

(30) Foreign Application Priority Data

Jan. 31, 2022 (FR) ..................................... 22 00847

(51) Int. Cl.
B60N 2/809 (2018.01)
B60N 2/882 (2018.01)

(52) U.S. Cl.
CPC ............. B60N 2/809 (2018.02); B60N 2/882 (2018.02)

(58) Field of Classification Search
CPC ........ B60N 2/809; B60N 2/882; B60N 2/829; B60N 2/821; B60N 2/824; B64D 11/0642; B64D 11/0647
See application file for complete search history.

(56) References Cited

U.S. PATENT DOCUMENTS

| | | | | |
|---|---|---|---|---|
| 4,711,492 A | * | 12/1987 | Asbjornsen | ............ A47C 7/405 |
| | | | | 297/284.7 |
| 4,854,639 A | | 8/1989 | Excelsior | |
| 4,941,222 A | * | 7/1990 | Prager | .................... A47C 1/143 |
| | | | | D6/601 |
| 5,567,011 A | * | 10/1996 | Sessini | ............... B60N 2/02246 |
| | | | | 297/284.7 |

(Continued)

FOREIGN PATENT DOCUMENTS

| | | |
|---|---|---|
| EP | 0326265 A2 | 8/1989 |
| EP | 0326265 A3 | 8/1989 |

(Continued)

OTHER PUBLICATIONS

French Search report for priority application No. FR 2200847, dated Aug. 12, 2022, 2 pages.

*Primary Examiner* — David R Dunn
*Assistant Examiner* — Tania Abraham
(74) *Attorney, Agent, or Firm* — Reising Ethington P.C.

(57) ABSTRACT

A support element having a body defining an outer surface and a rest element mounted in an adjustable manner on the body via an adjustment device that includes a guide element extending over the outer surface of the body. The guide element has a band fastened to the outer surface of the body, the adjustment device including a sliding element integral with the rest element, and being mounted in sliding contact on the band and having a free end extending between the band and the outer surface so as to allow adjustment of the position of the rest element relative to the body by sliding the sliding element on the guide element.

19 Claims, 4 Drawing Sheets

(56) References Cited

U.S. PATENT DOCUMENTS

| | | | | |
|---|---|---|---|---|
| 6,527,339 | B2 * | 3/2003 | Voris | B60N 2/2881 |
| | | | | 297/284.7 |
| 2008/0116731 | A1 | 5/2008 | Schurg | |
| 2015/0375651 | A1 * | 12/2015 | Palma | B60N 2/821 |
| | | | | 297/181 |
| 2016/0031351 | A1 * | 2/2016 | Galbreath | B60N 2/66 |
| | | | | 297/284.1 |
| 2016/0297336 | A1 * | 10/2016 | Suomi | B60N 2/242 |
| 2018/0178696 | A1 * | 6/2018 | Dexter | B60N 2/829 |
| 2019/0210493 | A1 * | 7/2019 | Woods | B60N 2/2872 |

FOREIGN PATENT DOCUMENTS

| | | | |
|---|---|---|---|
| FR | 3028465 | A3 | 5/2016 |
| WO | 2006029659 | A1 | 3/2006 |

* cited by examiner

SEAT SUPPORT ELEMENT COMPRISING AN ADJUSTABLE REST ELEMENT

TECHNICAL FIELD

The present disclosure relates to a seat support element of the type comprising a body and a rest element adjustably mounted to the body.

BACKGROUND

The invention applies, for example, to a vehicle seat back, having a rest element forming a height-adjustable headrest.

In a known way, the headrest of a vehicle seat is generally mounted on the backrest by means of rods integral with the headrest and received in sleeves extending into the body of the seat back. The height of the headrest is adjusted by sliding the rods into the sleeves and locking them when the desired position is reached.

Such a height adjustment requires a complex arrangement between the rods and the sleeves to allow the locking and unlocking of the position of the headrest. These operations further require a particular action on the part of the user in addition to the movement of the headrest in the case of manual operation of the height adjustment. Moreover, the assembly and disassembly of the headrest, for example to clean it, are complex, and the absence of a headrest makes the appearance of the seat back unsatisfactory because the openings for inserting the rods into the sleeves remain visible.

SUMMARY

These drawbacks may be overcome by providing a seat support element comprising a positionally adjustable rest element, the positional change of which is performed in a simple manner and which may be assembled and disassembled without difficulty, the support element retaining a satisfactory appearance when the rest element is disassembled.

To this end, an embodiment of the invention relates to a support element of the aforementioned type, wherein the guide element comprises a band fastened to the outer surface of the body and extending in the adjustment direction, the adjustment device further comprising at least one sliding element attached to the rest element, said sliding element being mounted in sliding contact on the band and comprising a free end extending between said band and the outer surface of the body so as to allow the positional adjustment of the rest element relative to the body by sliding the sliding element on the guide element in the adjustment direction.

By mounting the rest element on the outer surface of the support element body and simply sliding it over the band attached to the outer surface to change its position, there is no need to provide a sleeve or opening in the body to receive the rest element. Changing the position of the rest element may be done in a very simple way without the need for a locking system. Further, when the rest element is removed, the support element maintains a satisfactory appearance.

The support element may further comprise one or more of the following features, taken alone or in any technically feasible combination:

the band is sewn to the outer surface of the body by at least one seam, the guide element defining a groove between the band and the outer surface of the body, said groove extending from a side edge of the band to the seam, said seam forming the bottom of said groove, the free end of the sliding element being slidably mounted in said groove;

the band is fastened to the outer surface of the body by two seams, each extending in the vicinity of a side edge of the band so as to define with said outer surface two grooves extending in the guide direction on either side of the band;

the band is made of a flexible material, the guide element further comprising a rigid plate, the band extending around at least part of said rigid plate;

the adjustment device comprises two sliding elements secured to the rest element, each sliding element comprising a free end extending between said band and the outer surface of the body;

the sliding element is formed of a profile made of plastic material preferably having a U-shaped section, one of the branches of the U-shaped section extending against an inner surface of the rest element and the other branch of the U-shaped section forming the free end of the sliding element, the sliding element extending about a side edge of the band;

the free end of the sliding element has a curved shape towards the outer surface of the body so as to be constrained against said outer surface to ensure the rest element is locked in position on the body when no force in the adjustment direction is exerted on the rest element;

the sliding element is sewn onto a rigid plate extending into the rest element;

the body forms a seat back and the rest element forms a headrest;

the adjustment direction corresponds to the direction of elevation of the body, the position of the rest element being adjustable in height relative to the body.

BRIEF DESCRIPTION OF THE DRAWINGS

Further aspects and advantages of the invention will become apparent from the following description, given by way of example and made with reference to the attached drawings, wherein.

DETAILED DESCRIPTION

Figure 1:
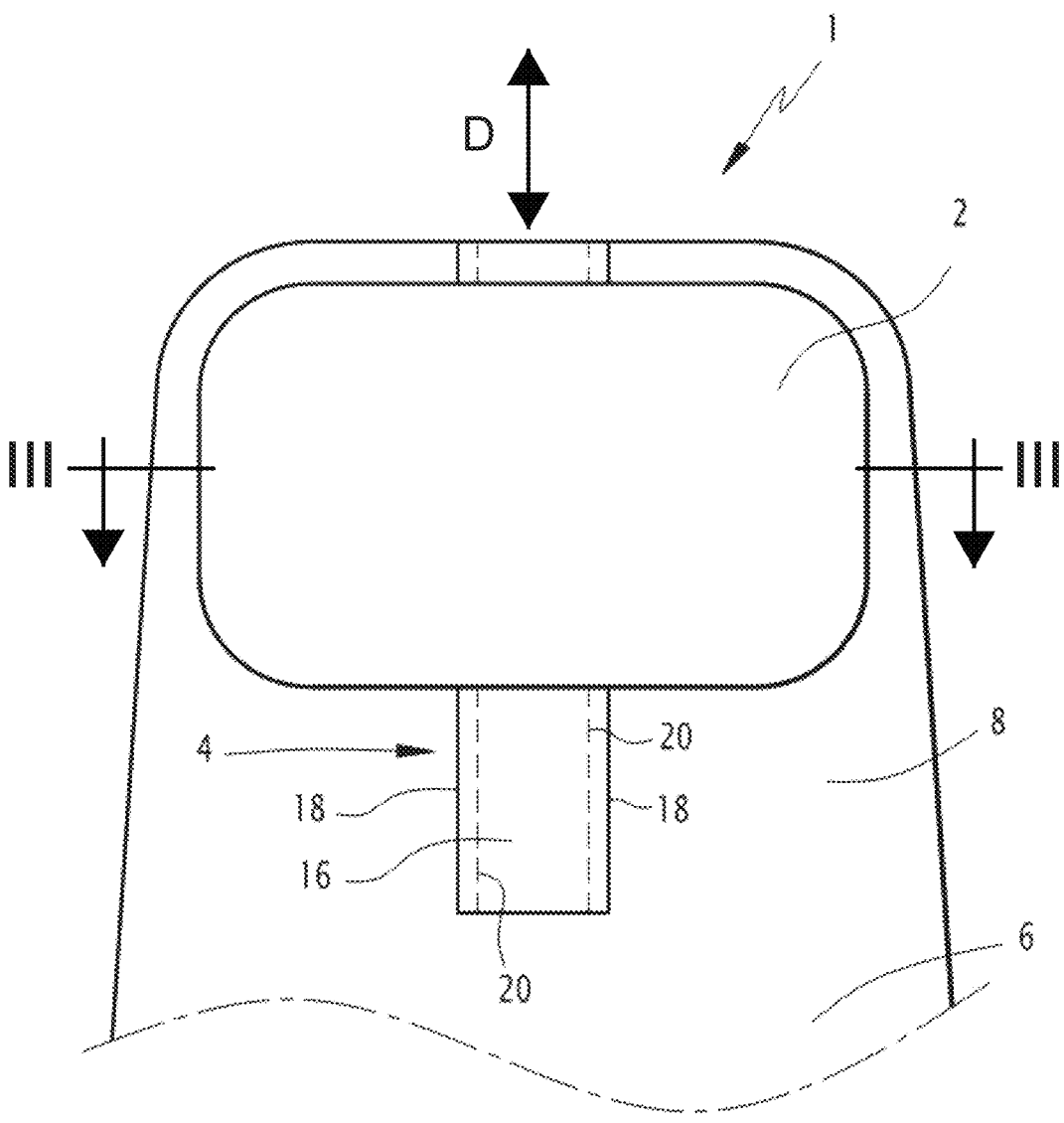
FIG. 1 is a schematic perspective representation of a support element according to an embodiment of the invention with the rest element in a first position.
Figure 2:
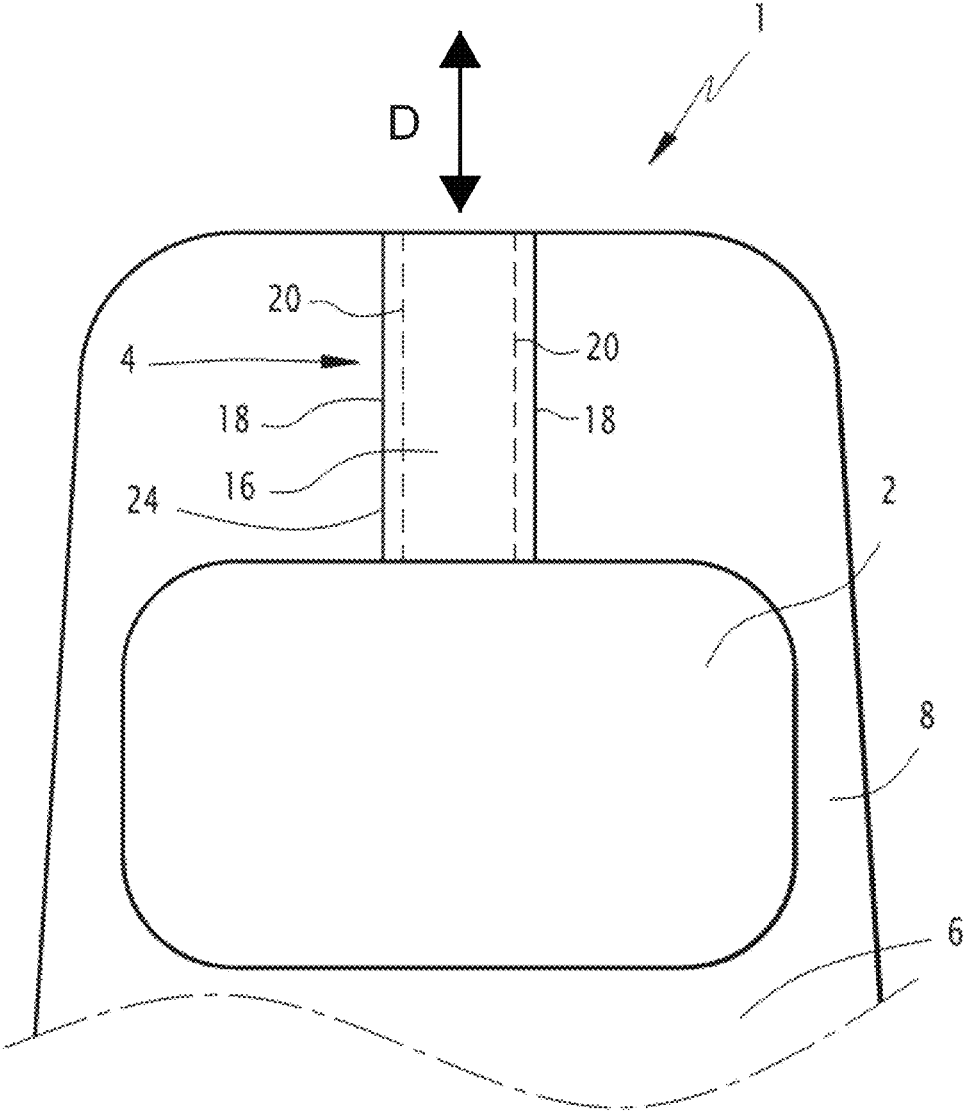
FIG. 2 is a schematic perspective representation of the support element of FIG. 1 with the rest element in a second position.

With reference to FIGS. 1 and 2, a seat support element 1 comprising a rest element 2 adjustably mounted in position along an adjustment direction D by means of an adjustment device 4 is described. The seat support element 1 shown in FIGS. 1 and 2 is a vehicle seat back and the rest element 2 is a height-adjustable headrest, i.e. the adjustment direction D corresponds to the direction in which the seat back rises. The remainder of the description will be made with reference to such a seat back and headrest. However, it is understood that in some embodiments the invention may be applied to another type of seat support element 1, such as a seat base, the rest element 2 then being, for example, a booster element, for example for a child.

The support element 1 comprises a body 6 defining an outer surface 8. The body 6 is arranged in terms of shape and mechanical features to accommodate an occupant of the seat. Thus, the body 6 comprises, for example, in a known way, a foam padding mounted on a metal frame, the occupant of the seat resting on the padding when sitting on the seat. The outer surface 8 forms the visible part of the body 6 from outside the support element 1. The outer surface 8 is formed, for example, of at least one trim element 10, such as leather or a textile upholstery layer, encasing the padding and the metal reinforcement. The trim element 10 thus gives the support element 1 its appearance. More particularly, the outer surface 8 comprises a receiving face shown in FIGS. 1 and 2, and a rear face, the receiving face and rear face extending on opposite sides of the body 6. The receiving face is defined as the face of the support element 1 on which an occupant of the seat rests when sitting in the seat.

The rest element 2 is mounted on the outer surface 8 of the body 6 so that it may be moved to translate in the adjustment direction D. In the case of a headrest, the rest element 2 is more particularly mounted on the receiving face of the outer surface 8 so as to face the head of an occupant of a seat when the occupant is sitting on the seat. It is understood that, in the case of another type of rest element, such as a shelf or the like, the rest element may be mounted on the rear face of the outer surface 8.

Figure 3:
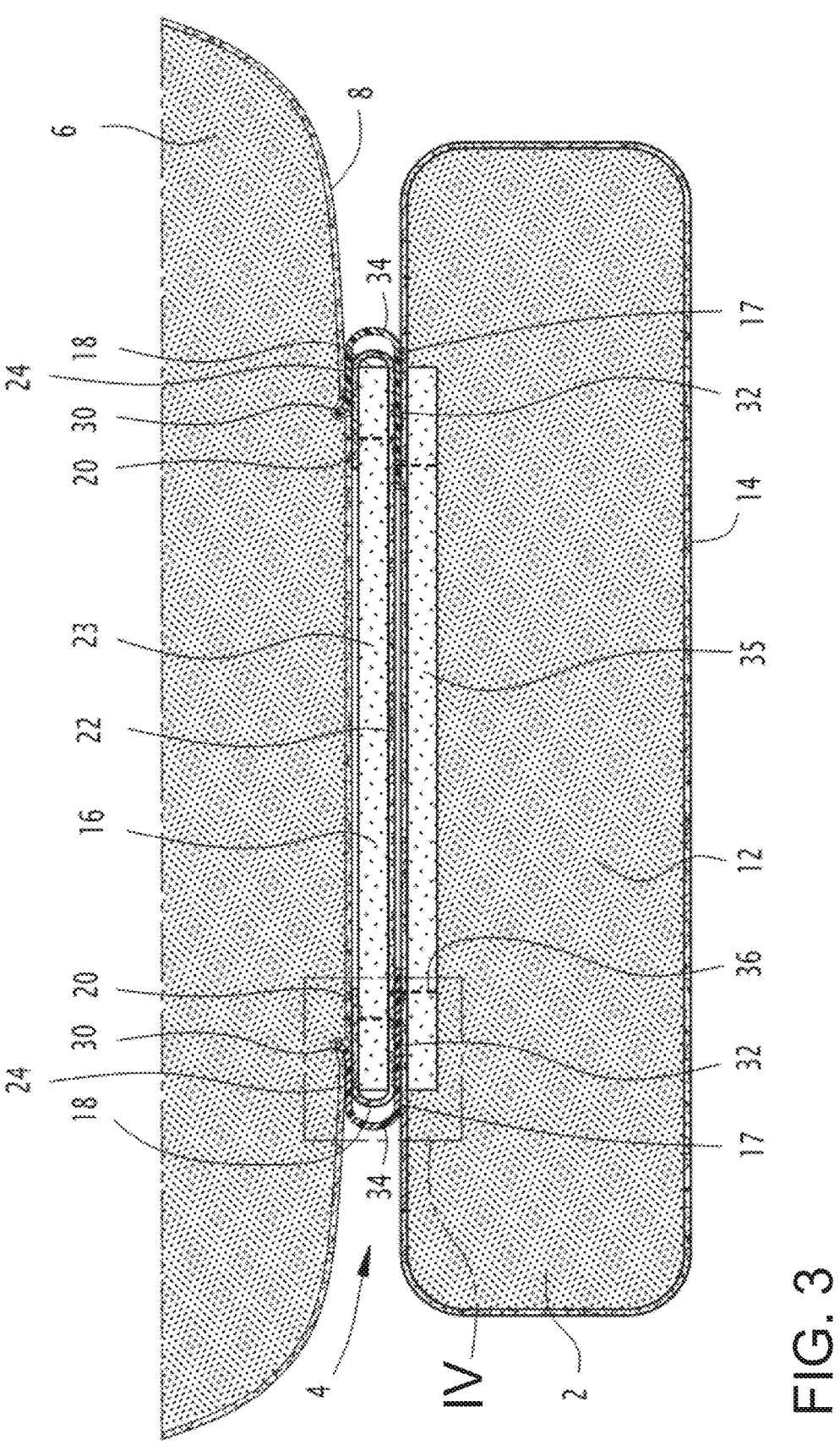
FIG. 3 is a schematic cross-sectional representation along the axis Ill-Ill of FIG. 1.

In the case of a headrest or booster, the rest element 2 comprises, for example, a foam body 12 covered with at least one trim element 14, as more particularly shown in FIG. 3, in order to form a cushion suitable for comfortably receiving an occupant of the seat.

The adjustment device 4 makes it possible, as mentioned previously, to move the rest element 2 on the outer surface 8 of the body 6 according to the adjustment direction D in order to allow it to be placed in different positions with respect to the body 6, as shown in FIGS. 1 and 2. More particularly, in the case of a headrest, the adjustment device 4 makes it possible to move the rest element 2 on the receiving face of the outer surface 8 in order to change the height of the rest element 2 on the body 6 so as to adapt the position of the rest element 2 to the size of the occupant of the seat. The rest element 2 is thus movable between a first position (FIG. 1) and a second position (FIG. 2). As will be described in more detail later, the adjustment device 4 also makes it possible to position the rest element 2 in a plurality of positions between these first and second positions. According to the embodiment shown in FIGS. 1 and 2, the rest element 2 extends in the vicinity of the upper edge of the body 6 in the first position and is close to the center of the body 6 in the second position. It should be noted that, in all the positions of the rest element 2, said support element always extends from the outer surface 8 of the body 6, and not above the body 6, as is the case of a traditional headrest.

The adjustment device 4 comprises a guide element 16 and at least one sliding element 17 slidably mounted on the guide element 16.

Figure 4:
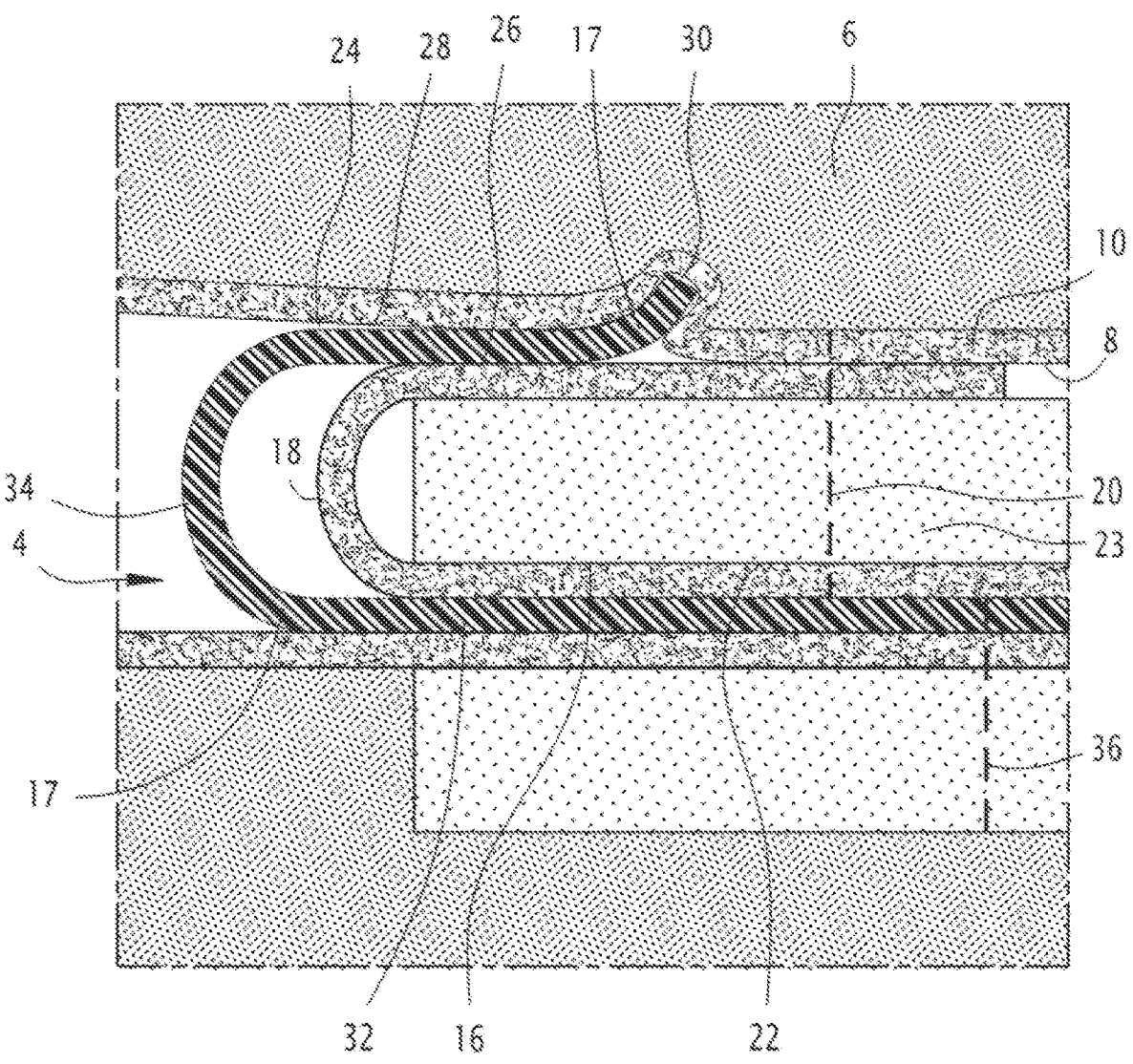
FIG. 4 is an enlarged schematic representation of a detail IV of FIG. 3.

The guide element 16 extends over the outer surface 8 of the body 6 mainly in the adjustment direction D, i.e. the largest dimension of the guide element 16 extends in the adjustment direction D. This dimension along the adjustment direction corresponds substantially to the distance between the first position and the second position so that the rest element 2 extends from a portion of the guide element 16 in all the positions of the rest element 2 relative to the body 6. As shown in FIGS. 3 and 4, the guide element 16 is for example formed of a band 22 comprising two side edges 18 extending along the adjustment direction D on both sides of the band 22. The guide element 16 is fastened to the outer surface 8 of the body 6, for example by sewing the band 22 to the body 6. More particularly, the band 22 is attached to the body 6, for example, by at least one seam 20 extending along the adjustment direction D in the vicinity of a side edge 18. According to the embodiment shown in the figures, the band 22 is fastened to the body 2 by two seams 20 extending in the vicinity of the two side edges 18 of the band 22. The distance between a seam 20 and the side edge 18 in the vicinity of which this seam 20 extends is for example between 8 mm and 10 mm. The seams 20 extend over the entire length, or height, of the band 22 measured along the adjustment direction D.

The band 22 is formed of a flexible material, such as a leather or a textile material. The band 22 is advantageously of the same kind as the trim element 10 of the body 6.

According to the embodiment shown in FIGS. 3 and 4, the guide element 16 further comprises a rigid plate 23 around at least a part of which the band 22 extends. A rigid plate is defined as a plate made of a material more rigid than that of the band 22, for example cardboard or a plastic material. The rigid plate 23 thus makes it possible to stiffen the guide element 16 so that said guide element may support the rest element 2, as will be described later. The band 22 extends at least over the outer face of the rigid plate 23 and passes around the side edges of the rigid plate 23, so that the band 22 comprises a marginal part applied against the outer surface 8 of the body 6. In fact, except for the part of the outer face from which the rest element 2 extends, the rest of the outer face is visible from the outside of the support element 1, as shown in FIGS. 1 and 2. Thus, the presence of the band 22 of the guide element 16 on the outer surface 8 of the body 6 does not degrade the appearance of the support element 1 and may even be used to confer a particular distinctive appearance to the support element 1. The seams 20 extend for example from the outer face of the band 22, through the rigid plate 23 and the marginal part of the band 22 applied to the outer surface 8 of the body 6, up to the body 6. The seams 20, for example, extend through the trim element 14 of the body 6 to penetrate the padding of the body 6 and thus ensure a robust attachment of the guide element 16 to the body 6.

The guide element 16 defines at least one groove 24 extending along the adjustment direction D. The groove 24 is open towards the outside of the guide element in a direction substantially parallel to the outer surface 8 of the body 6. The groove 24 extends at least over the entire path of the rest element 2 between the first position and the second position. The groove 24 is delimited by the outer surface 8 of the body 6 on the one hand and by the band 22 on the other, i.e. the groove 24 extends between the outer surface 8 of the body 6 and the part of the band 22 which is turned toward the outer surface 8 of the body 6, for example the marginal part of the band 22 which extends between the rigid plate 23 and the outer surface 8 of the body 6. More particularly, according to this embodiment, the band 22 is fastened to the outer surface 8 of the body 6 so that the side edges 18 are spaced from the outer surface 8 of the body 6 in order to leave a space in the vicinity of the side edges 18 between the band 22 and the outer surface 8 of body 6 to form two grooves 24 extending on either side of band 22. The bottom of each groove 24 is then formed by the seam 20 so that each groove 24 comprises a wall 26 formed by the part of the band 22 extending between a side edge 18 and the corresponding seam 20, a wall 28 formed by the outer surface 8 of the body 6 extending from this part of the plate, and a bottom formed by the seam 20. Consequently, the depth of a groove 24 corresponds substantially to the distance separating the side edge 18 from the corresponding seam 20. Thus, the grooves 24 may be formed in a particularly simple manner by fastening the band to the outer surface 8 of the body 6, the band not needing to have a particular shape to delimit the groove or grooves 24. According to one embodiment, the wall 26 is applied against the wall 28 outside the part of the guide element 16 receiving the sliding element 17, as will be described later. In other words, the groove 24 may be closed outside the zone of the groove 24 where the sliding element 17 extends, the groove 24 opening due to the deformability of the body 6 and/or its trim element 10 in the zone receiving the sliding element 17.

Each groove 24 may be open at at least one of its ends in the adjustment direction D. According to one embodiment, the groove 24 may be open at both ends along the adjustment direction D so that a sliding element 17 may be introduced into the groove 24 by one of its ends by moving the sliding element 17 in the adjustment direction D when a rest element 2 is to be mounted on the body 6 of the support element 1, as will be described in more detail hereinafter.

The sliding element 17 is formed of a profile, for example made of plastic material, fastened to the rest element 2 and extending from the inner face of the rest element 2, this inner face being turned toward the outer surface 8 of the body 6. The profile extends along the adjustment direction D on the inner face of the rest element 2 and has a length measured along this direction slightly less than that of the rest element 2, for example at least half the height of the rest element 2 measured in the adjustment direction D. In other words, the sliding element 17 extends over a major part of the rest element 2 along the adjustment direction D.

The sliding element 17 is slidably mounted on the guide element 16 to allow the movement of the rest element 2 along the guide element 16 in the adjustment direction D. To this end, the sliding element 17 is mounted in sliding contact on the band 22. "Sliding contact" means that the sliding element 17 may slide along the band 22 continuously. In other words, the band 22 does not comprise notches receiving the sliding element 17 in different positions. The sliding element 17 comprises a free end 30 slidably mounted in the groove 24, as shown in FIGS. 3 and 4. The free end 30 is also arranged to hold the rest element 2 in the position wherein it has been placed when no force in the adjustment direction D is exerted on the rest element 2. In other words, the sliding element 17 makes it possible to move the rest element 2 along the guide element 16 when a user exerts a force on the rest element 2 in the adjustment direction D to change its position, and the rest element 2 remains in the position in which it was placed when the user ceases to exert this force. Thus, the adjustment device does not require the use of a locking device or notches, as indicated above, to maintain the rest element 2 in a particular position.

In order to ensure the sliding in the groove 24, the free end 30 has the shape of a branch extending in the groove 24, for example from the side edge 18 to the vicinity of the bottom formed by the seam 20. The free end 30 has, for example, a length, measured along the direction going from the side edge 18 to the seam 20, 1 mm or 2 mm less than the depth of the groove 24. In other words, the free end 30 has a length comprised between 6 and 9 mm for a groove 24 having a depth comprised between 8 and 10 mm.

In order to ensure that the rest element 2 is locked in the position in which it has been placed in the absence of force along the adjustment direction D, the free end 30 has, for example, a shape curved towards the outer surface 8 of the body 6, as shown in FIG. 4. Such a curved shape allows the free end 30 to be constrained against the outer surface 8 of the body 6 and prevents the movement of the rest element 2 when it is not voluntarily moved by a user. In fact, the curved shape allows the free end 30 to "sink" into the body 6 and/or its trim element 10 due to the flexibility thereof and thus ensures that the rest element 2 locks on the guide element 2. Locking may be further enhanced if the groove 24 is closed on both sides of the sliding element 17, as described above. Thus, the friction between the sliding element 17, the band 22, and the body 6 and its trim element 10 makes it possible to ensure that the rest element 2 locks in position, this friction further being arranged to allow a movement of the rest element 2 when a user exerts a force in the adjustment direction D on the rest element 2.

To secure the sliding element 17 to the rest element 2, the profile comprises, for example, a further branch 32 sewn to the rest element 2. The branch 32 is connected to the branch forming the free end 30 by a base 34 extending from the side edge 18 when the rest element 2 is mounted on the guide element 16, as shown in FIG. 3. Thus, the sliding element 17 has, for example, a U-shaped cross-section, with one of the branches 32 of the U extending against the inner surface of the rest element 2 and being sewn thereto, the other of the branches of the U forming the free end 30 inserted in a groove 24 and the base 34 allowing the sliding element 17 to extend around the corresponding side edge 18 of the band 22 of the guide element 16.

In order to ensure a strong attachment of the sliding element 17 to the rest element 2, the branch 32 is, for example, sewn onto a rigid plate 35 extending into the rest element 2 on the side of the inner surface thereof. The rigid plate 35 extends over the reverse side of the trim element 14 of the rest element 2. A seam 36 secures the branch 32 to the rigid plate 35 by penetrating the trim element 14, as shown in FIG. 3.

The adjustment device 4 comprises, for example, two sliding elements 17 as described above, each sliding element 17 cooperating with one of the grooves 24 of the guide element 16, as shown in FIG. 3. In this case, the U-shapes of the sliding elements 17 are open towards each other. This ensures a robust mounting of the rest element 2 on the body 6 of the support element 1 and notably prevents a change in orientation of the rest element 2 relative to the body 6.

The rest element 2 may easily be dismantled from the body 6. To do this, it suffices to move the rest element in the adjustment direction D until the sliding element or elements 17 come out of the groove or grooves 24 via one end thereof. Assembly is also easily done by inserting the sliding element (s) 17 along the adjustment direction D into the groove(s) 24 via one end thereof. Thus the rest element 2 may be removed from the support element 2, for example to clean it, and put back on without requiring the use of a particular tool. Furthermore, the absence of a rest element 2 does not degrade the appearance of the support element 1.

The grooves 24 have been described as extending on either side of the band 22 forming the guide element 16. It is however understood that the groove could be made in the guide element, for example substantially at the center thereof and cooperate with a single sliding element introduced into the groove 24. To this end, the sliding element could have a T-shaped cross-section and cooperate with a groove of a complementary shape.

The invention claimed is:

1. A seat support element comprising a body defining an outer surface and a rest element mounted so as to be adjustable in an adjustment direction on the body by an adjustment device, the adjustment device comprising a guide element extending on the outer surface of the body, wherein said guide element comprises a band fastened to the outer surface of the body and extending along the adjustment direction, the adjustment device further comprising at least one sliding element attached to the rest element, said sliding element being mounted in sliding contact on the band and comprising a free end extending between said band and the outer surface of the body so as to allow adjustment of the position of the rest element relative to the body by sliding the sliding element on the guide element in the adjustment direction, wherein the band is made of a flexible material, the guide element further comprising a rigid plate, the band extending around at least one part of said rigid plate.

2. The support element according to claim 1, wherein the adjustment device comprises two sliding elements integral with the rest element, each sliding element comprising a free end extending between said band and the outer surface of the body.

3. The support element according to claim 1, wherein the sliding element is formed by a profile made of plastic material having a U-shaped cross-section, one branch of the U-shaped cross-section extending against an inner surface of the rest element and another branch of the U-shaped cross-section forming the free end of the sliding element, the sliding element extending about a side edge of the band.

4. The support element according to claim 1, wherein the free end of the sliding element has a shape curved toward the outer surface of the body so as to be constrained against said outer surface to ensure the rest element is locked in position on the body when no force in the adjustment direction is exerted on the rest element.

5. The support element according to claim 1, wherein the sliding element is sewn to a different rigid plate extending into the rest element.

6. The support element according to claim 1, wherein the body forms a seat back and the rest element forms a headrest.

7. The seat support element according to claim 1, wherein the band is sewn to the outer surface of the body by at least one seam, the guide element defining a groove between the band and the outer surface of the body, said groove extending from an open end at a side edge of the band to the seam, said seam forming the bottom of said groove, the free end of the sliding element being slidably mounted in said groove.

8. The support element according to claim 1, wherein the band is fastened to the outer surface of the body by two seams each extending in the vicinity of a side edge of the band so as to define with said outer surface two grooves extending along the adjustment direction on either side of the band.

9. The support element according to claim 1, wherein the adjustment direction corresponds to a direction of elevation of the body, the position of the rest element being adjustable in height relative to the body.

10. A seat support element comprising a body defining an outer surface and a rest element mounted so as to be adjustable in an adjustment direction on the body by an adjustment device, the adjustment device comprising a guide element extending on the outer surface of the body, wherein said guide element comprises a band fastened to the outer surface of the body and extending along the adjustment direction, the adjustment device further comprising at least one sliding element attached to the rest element, said sliding element being mounted in sliding contact on the band and comprising a free end extending between said band and the outer surface of the body so as to allow adjustment of the position of the rest element relative to the body by sliding the sliding element on the guide element in the adjustment direction, wherein the sliding element is sewn to a rigid plate extending into the rest element.

11. The support element according to claim 10, wherein the adjustment device comprises two sliding elements integral with the rest element, each sliding element comprising a free end extending between said band and the outer surface of the body.

12. The support element according to claim 10, wherein the sliding element is formed by a profile made of plastic material having a U-shaped cross-section, one branch of the U-shaped cross-section extending against an inner surface of the rest element and another branch of the U-shaped cross-section forming the free end of the sliding element, the sliding element extending about a side edge of the band.

13. The support element according to claim 10, wherein the free end of the sliding element has a shape curved toward the outer surface of the body so as to be constrained against said outer surface to ensure the rest element is locked in position on the body when no force in the adjustment direction is exerted on the rest element.

14. The support element according to claim 10, wherein the body forms a seat back and the rest element forms a headrest.

15. The support element according to claim 10, wherein the band is made of a flexible material.

16. The support element according to claim 10, the guide element further comprising a different rigid plate, the band extending around at least one part of said different rigid plate.

17. The seat support element according to claim 10, wherein the band is sewn to the outer surface of the body by at least one seam, the guide element defining a groove between the band and the outer surface of the body, said groove extending from an open end at a side edge of the band to the seam, said seam forming the bottom of said groove, the free end of the sliding element being slidably mounted in said groove.

18. The support element according to claim 10, wherein the band is fastened to the outer surface of the body by two seams each extending in the vicinity of a side edge of the band so as to define with said outer surface two grooves extending along the adjustment direction on either side of the band.

19. The support element according to claim 10, wherein the adjustment direction corresponds to a direction of elevation of the body, the position of the rest element being adjustable in height relative to the body.

* * * * *